United States Patent [19]
Ogawa et al.

[11] Patent Number: 6,146,741
[45] Date of Patent: Nov. 14, 2000

[54] INFORMATION RECORDING MEDIUM AND PRODUCTION PROCESS THEREOF

[75] Inventors: Yoshihiro Ogawa, Hachioji; Kazumi Nagano, Fujisawa, both of Japan

[73] Assignee: Canon Kabushiki Kaisha, Tokyo, Japan

[21] Appl. No.: 09/041,311

[22] Filed: Mar. 12, 1998

[30] Foreign Application Priority Data

Mar. 14, 1997 [JP] Japan .................................. 9-079253

[51] Int. Cl.$^7$ ...................................................... B32B 3/00
[52] U.S. Cl. .......................... 428/195; 283/108; 427/256; 428/212
[58] Field of Search ................................... 428/332, 195, 428/411.1, 916; 430/10, 11, 14, 18; 283/72, 94, 107, 108

[56] References Cited

U.S. PATENT DOCUMENTS

| | | | |
|---|---|---|---|
| 4,151,666 | 5/1979 | Raphael et al. ............................ | 40/2.2 |
| 4,965,153 | 10/1990 | Imataki et al. ............................ | 430/11 |
| 4,972,402 | 11/1990 | Miura et al. .......................... | 369/275.1 |
| 4,975,310 | 12/1990 | Nagano ...................................... | 428/64 |
| 5,026,623 | 6/1991 | Imataki et al. ............................ | 430/270 |
| 5,158,859 | 10/1992 | Imatake et al. ........................... | 430/271 |
| 5,248,584 | 9/1993 | Miura et al. .............................. | 430/270 |
| 5,312,714 | 5/1994 | Ogawa ....................................... | 430/273 |
| 5,447,767 | 9/1995 | Tanabe et al. ........................... | 428/64.4 |
| 5,534,372 | 7/1996 | Koshizuka et al. ........................ | 430/10 |
| 5,572,492 | 11/1996 | Ogawa ....................................... | 369/14 |

FOREIGN PATENT DOCUMENTS

| | | |
|---|---|---|
| 0250227 | 12/1987 | European Pat. Off. . |
| 0298687 | 1/1989 | European Pat. Off. . |
| 60-163245 | 8/1985 | Japan . |
| 60-236131 | 11/1985 | Japan . |

*Primary Examiner*—Bruce Hess
*Assistant Examiner*—Michael E. Grendzynski
*Attorney, Agent, or Firm*—Fitzpatrick, Cella, Harper & Scinto

[57] ABSTRACT

Disclosed herein is an information recording medium comprising a card substrate and a print-receiving layer provided on the surface thereof, wherein the print-receiving layer is provided with a forgery-preventing layer at a part of the surface thereof, and the forgery-preventing layer is allowed to print on the surface thereof and is embedded in the print-receiving layer.

43 Claims, 2 Drawing Sheets

INFORMATION RECORDING MEDIUM AND PRODUCTION PROCESS THEREOF

BACKGROUND OF THE INVENTION

1. Field of the Invention

The present invention relates to an information recording medium and a production process thereof.

2. Related Background Art

At present, magnetic recording cards such as credit cards and bank cards have spread as personal information recording media. In recent years, IC cards, optical cards and the like have been proposed as portable information recording media having a greater storage capacity. It is also considered that such cards are applied to electronic moneys, bankbooks in which account data are recorded, and the like by making good use of such a great storage capacity. Although a passport, driver's license or the like has been used as a certifying means for an individual, it has been proposed to use, for example, optical cards and IC cards for these licenses. In order to use the IC cards, optical cards and the like as ID cards, devices for reproducing the information stored in the IC cards and optical cards are newly required. It takes a long time to spread these devices for reproducing the information stored in the IC cards and optical cards to the termini with the spread of the IC cards and optical cards. In the course of their combined use with the conventional systems, it is accordingly preferable to apply visible information such as a portrait, ID number or name to such a card.

The application of character information and image information such as a photograph (hereinafter referred to as "visible information"), which can be usually visually read out by persons, to the card can be conducted by, for example, thermal transfer printers (sublimate type thermal transfer printer, melt transfer type thermal transfer printer, etc.). Such a card is so designed that part of pigments and dyes which form these images and characters formed on the surface of the card diffuse into or mix with a resin forming the surface of the plastic card, thereby enhancing the wear resistance and adhesion strength of the printed characters and images.

By the way, the portable information recording medium dealing with such important information is required to have a construction difficult to forge for the purpose of avoiding the possibility of being illegally used by another third party than the regular cardholder as much as possible. As such methods, there have been proposed, for example, a method in which data of an issuer and/or a particular mark is provided as hologram information on the medium in advance, and a method in which semi-shielding information which cannot be understood only at sight, such as a watermark or microline, is provided. However, when such a card is used as an identification card using only the visible personal information provided on the surface without reproducing the optically stored information, it is possible to impersonate the regular cardholder if only the visible information can be forged. The easiest forging method supposable herein is a method in which the personal information of the regular cardholder provided on the surface of, for example, an information recording medium found is removed, and the personal information of a third party is newly printed. Specific examples thereof include a method in which the printed information is removed by dissolution with a solvent, or the printed information and its traces are removed by gradually abrading with finely particulate abrasives or the like, and forged information is reformed by printing such as thermal transfer printing.

There is thus a demand for development of an information recording medium which can more effectively prevent such forgery.

SUMMARY OF THE INVENTION

In view of the foregoing circumstances, the present invention has been made, and an object of the present invention is to provide an information recording medium which has a high preventive effect on forgery of visible information and makes it difficult to circulate it through the market if it is forged.

Another object of the present invention is to provide an information recording medium comprising an optical recording layer, to which visible information will be or has been applied, wherein the visible information which will be or has been applied to the information recording medium is difficult to forge, and the information recording medium, which is expected to suffer a great deal of damage when illegally used because a great amount of information can be stored therein, can make it difficult to circulate it through the market if it is forged.

A further object of the present invention is to provide a process for producing an information recording medium comprising an optical recording layer, to which visible information extremely difficult to forge can be applied.

A still further object of the present invention is to provide a process for applying visible information difficult to forge to an information recording medium equipped with an optical recording layer.

A yet still further object of the present invention is to provide an information recording medium comprising an IC chip, in which visible information applicable to the surface thereof is difficult to forge, and the alteration of the visible information applied thereto can be made clear if it is forged.

The above objects can be achieved by the present invention described below.

According to one aspect of the present invention, there is provided an information recording medium comprising a card substrate and a print-receiving layer provided on the surface thereof, wherein the print-receiving layer is provided with a forgery-preventing layer at a part of the surface of the print-receiving layer, and the forgery-preventing layer is allowed to print on the surface of the forgery-preventing layer and is embedded in the print-receiving layer.

According to another aspect of the present invention, there is provided an information recording medium comprising a transparent substrate, an optical recording layer, a protective layer and a print-receiving layer in that order, wherein the print-receiving layer is provided with a forgery-preventing layer which is arranged in such a manner that an outer surface of the forgery-preventing layer and an outer surface of the print-receiving layer are substantially on a same plain, and the forgery-preventing layer has a surface visually distinguishable from the print-receiving layer and a thickness of 0.1 to 1 $\mu$m.

According to a further aspect of the present invention, there is provided a process for producing an information recording medium comprising a transparent substrate, an optical recording layer, a protective layer and a print-receiving layer in that order, wherein the print-receiving layer is provided with a forgery-preventing layer which is arranged in such a manner that an outer surface of the forgery-preventing layer and an outer surface of the print-receiving layer are substantially on a same plain, and the forgery-preventing layer has a surface visually distinguishable from the print-receiving layer and a thickness of 0.1 to 1 μm, which comprises the steps of:

(i) forming the optical recording layer on the surface of the transparent substrate;

(ii) forming the print-receiving layer on the surface of the protective layer;

(iii) forming the forgery-preventing layer on the outer surface of the print-receiving layer;

(iv) embedding the forgery-preventing layer in the print-receiving layer; and (v) bonding the transparent substrate having the optical recording layer to the protective layer having the print-receiving layer in which the forgery-preventing layer has been embedded, in such a manner that the optical recording layer faces a side of the protective layer, opposed to the other side on which print-receiving layer has been formed, thereby obtaining the information recording medium.

According to still another aspect of the present invention, there is provided a process for applying visible information to an information recording medium comprising an optical recording layer, which comprises the steps of:

i) providing an information recording medium comprising a transparent substrate, an optical recording layer, a protective layer and a print-receiving layer in that order, wherein the print-receiving layer is provided with a forgery-preventing layer having an outer surface visually distinguishable from the print-receiving layer and a thickness of 0.1 to 1 μm, and the forgery-preventing layer is arranged in such a manner that an outer surface of the forgery-preventing layer and an outer surface of the print-receiving layer are on a same plain; and ii) applying the visible information so as to extend over both the outer surface of the print-receiving layer and the outer surface of the forgery-preventing layer.

According to still a further aspect of the present invention, there is provided an information recording medium comprising a substrate provided with an IC chip, wherein the substrate is provided, on at least one side thereof, with a print-receiving layer which is provided with a forgery-preventing layer having an outer surface visually distinguishable from the print-receiving layer and a thickness of 0.1 to 1 μm, and the forgery-preventing layer is arranged in such a manner that an outer surface of the forgery-preventing layer and an outer surface of the print-receiving layer are on a same plain.

DESCRIPTION OF THE PREFERRED EMBODIMENTS

Figure 1:
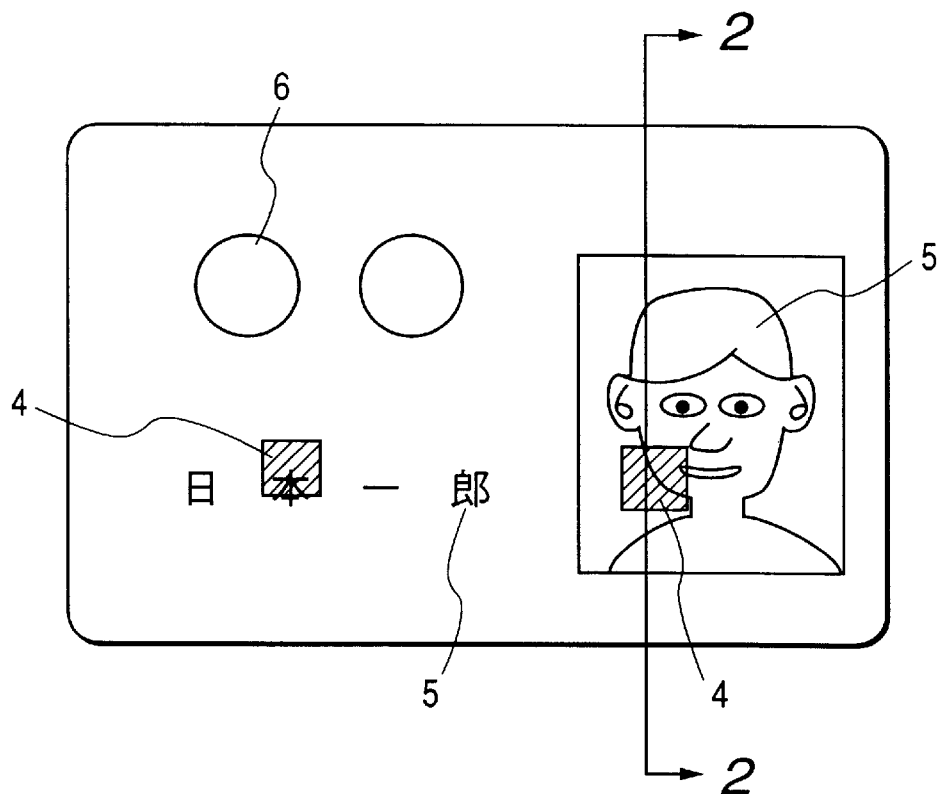
FIG. 1 is a schematic plan view of an information recording medium according to an embodiment of the present invention.

The construction of an information recording medium according to an embodiment of the present invention illustrated in FIGS. 1 to 3 will hereinafter be described. Reference numeral 8 designates a transparent substrate. A hard coat layer 7 is formed on one side thereof. Guide grooves 9 and an optical recording layer 10 are formed on the other side of the substrate. A protective substrate 12 is laminated on the optical recording layer 10 with an adhesive layer 11 inserted therebetween. A design print 6 is formed in advance on the inner surface of the protective substrate 12. A masking layer 13 is formed on the outer surface of the protective substrate 12, and another design print 6 is provided on the shielding layer 13. On the masking layer 13, a print-receiving layer 2 and a forgery-preventing layer 4 are formed. One surface of the forgery-preventing layer 4 forms one surface of the information recording medium together with one surface of the print-receiving layer 2. Reference numeral 5 designates visible information (for example, ID information such as signature, name, portrait and/or the like of a cardholder). The visible information 5 is applied by, for example, printing, so as to extend over both the outer surface of the print-receiving layer 2 and the outer surface of the forgery-preventing layer 4.

In such an information recording medium, it is preferable to make substantially no difference in level between the outer surface of the forgery-preventing layer 4 and the outer surface of the print-receiving layer 2. Specifically, the difference in level is preferably at most 0.2 μm, particularly at most 0.1 μm. The thickness of the forgery-preventing layer 4 is preferably 0.1 to 1 μm, particularly 0.2 to 1 μm. Further, the outer surface of the forgery-preventing layer 4 and the outer surface of the print-receiving layer 2 preferably have different optical properties, for example, reflectance, from each other in order that that both outer surfaces may be visually distinguished from each other. The various constituents described above are intended to make it difficult to forge the visible information applied to the surface of the forgery-preventing layer 4. As a method of forging the visible information applied to the surface of, for example, the forgery-preventing layer 4, it is considered to scrape off the visible information by, for example, abrasion, and apply new visible information thereto. When the thickness of the forgery-preventing layer is preset to 0.1 to 1 μm, however, it is extremely difficult to scrape off only the print on the surface of the forgery-preventing layer, and so the forgery-preventing layer itself is also scraped off. As a result, traces of some alteration having been made to the forgery-preventing layer, such as change in optical properties of the forgery-preventing layer, or occurrence of a difference in level between the forgery-preventing layer and the print-receiving layer 2, remain.

Even if a third party intends to remove the forgery-preventing layer by abrasion and then apply some visible information thereto by printing or the like, it is difficult to properly print such visible information at the place where the forgery-preventing layer has been situated if a difference in level exceeding 0.2 μm arises between such a place and the surface of the print-receiving layer. In particular, it is extremely difficult to print continuous visible information over both the surface of the print-receiving layer and the surface of the place where the forgery-preventing layer has been situated.

It is also considered to scrape off the forgery-preventing layer once, form a new forgery-preventing layer and then apply new visible information thereto, thereby intending to forge the original visible information. However, it is difficult to form a new forgery-preventing layer having the same optical properties as the original forgery-preventing layer in such a manner that the outer surface of the forgery-preventing layer newly formed makes substantially no difference in level with the outer surface of the print-receiving layer without impairing the function of the optical recording layer. In order to make such forgery more difficult, it is also preferable to use a recording layer containing an organic dye having relatively low heat resistance as the optical recording layer or to contain a temperature indicator in the information recording medium in advance. More specifically, in order to make substantially no difference in level between both outer surfaces of the forgery-preventing layer and the print-receiving layer, a method in which the forgery-preventing layer is formed on the print-receiving layer and then embedded in the print-receiving layer by hot pressing or the like as will be described subsequently in this specification is most preferably used. When the hot pressing is conducted to embed the forgery-preventing layer in the print-receiving layer in the state that the protective substrate, on which the print-receiving layer has been formed, has been bonded to the transparent substrate provided with the optical recording layer, however, the function of the optical recording layer is impaired by heat, pressure and the like, so that the possibility of some alteration having been made to the information recording medium can be left on the information recording medium as traces. More specifically, for example, when a sheet of a hard vinyl chloride resin is used as the print-receiving layer, and a cured product of a urethane-acrylate type ultraviolet curing resin is used as the forgery-preventing layer, it is preferable to heat both layers, for example, at 140 to 150° C. for about 30 seconds in order to embed the forgery-preventing layer in the print-receiving layer. At this time, when the temperature resistance of the optical recording layer is preset to, for example, 140 to 150° C., the function of the optical recording layer is destroyed when the forgery-preventing layer is embedded after the optical recording layer is formed.

The individual members making up the information recording medium according to this embodiment will then be described.

Print-receiving Layer

As the print-receiving layer 2, is used a material to the surface of which visible information can be applied by printing or the like. The material is preferably easy to embed the forgery-preventing layer therein. Specific examples thereof include vinyl chloride resins. In order to give no influence on the thickness of the resulting information recording medium and make the embedding of the forgery-preventing layer easy, the thickness of the print-receiving layer is preferably 30 to 100 $\mu$m.

Forgery-preventing Layer

Examples of preferable properties of a material for the forgery-preventing layer include the following properties:

(1) being able to print on the surface of the resulting forgery-preventing layer by, for example, a sublimate type thermal transfer printer;

(2) not sticking to a metal plate (aluminum, stainless steel of the like) of pressing member upon embedding of the resulting forgery-preventing layer in the print-receiving layer by hot pressing; and (3) being able to contain pigments and other substances therein.

Examples of the material for forming a forgery-preventing layer satisfying the above-described properties (1) to (3) include materials obtained by incorporating pigments, other substances and/or the like into the following resins.

As the resins are preferred two-component curable type resins and ultraviolet curable resins.

No particular limitation is imposed on the two-component curing type resins. For example, a urethane-acrylate resin obtained by mixing an acrylic resin and a vinyl chloride resin is useful. When the vinyl chloride resin is contained in a proportion of about 20 to 60% by weight to the other resin, printing can be beautifully conducted on the resulting forgery-preventing layer by a thermal transfer printer, and the two-component curable resin is prevented from sticking to the metal plate.

No particular limitation is imposed on the ultraviolet curable resins. However, preferable examples thereof include resins comprising, as a main component, acryl polyol (urethane acrylate), epoxy acrylate or unsaturated polyester acrylate. A vinyl chloride resin may also be added. As a photo polymerization initiator, is used a ketone such as 2-hydroxy-2-methylpropiophenone or 1-hydroxy-1-benzoylcyclohexane. Incidentally, it is important that the resin does not stick to the pressing metal plate in the hot pressing step (processing) for embedding the forgery-preventing layer in the vinyl chloride resin sheet.

As the pigments and other substances, may be used metal foil about 10 to 200 $\mu$m square, metal particles, pearlescent pigments, ultraviolet-luminescent inks and the like.

The amount of the pigments and other substances to be added to the resin may be such that the resulting forgery-preventing layer can be visually distinguished from the print-receiving layer. For example, it is desirably 10% by weight or lower, preferably 1 to 5% by weight.

The thickness of the forgery-preventing layer is desirably within a range of from 0.1 to 1 $\mu$m, preferably from 0.2 to 1 $\mu$m. When the thickness is controlled within this range, it is extremely difficult to scrape off the visible information layer on the surface of the forgery-preventing layer while leaving the forgery-preventing layer. Alternatively, when the visible information layer is scraped off together with the forgery-preventing layer, a difference in level arises between the print-receiving layer and the place where the forgery-preventing layer has been situated, so that traces of some alteration having been made to the forgery-preventing layer are left.

Transparent Substrate

As the transparent substrate 8, may be used a plastic sheet having good transparency and formed of PVC, polymethyl methacrylate, polycarbonate, polysulfone, polyolefin resin or the like.

Protective Substrate

The protective substrate 12 is preferably formed of a material difficult to cause "warpage" on the whole of the resulting recording medium. Examples of suitable materials include plastic materials such as PMMA, polycarbonate and polyvinyl chloride.

The protective substrate 8 may not be transparent in order to decrease transmittance of the information recording medium in its thickness.

Hard Coat Layer

As a material for the hard coat layer 7, may be used an ultraviolet curable resin such as urethane acrylate, unsaturated polyester or epoxy acrylate, or a silicone thermosetting resin. Urethane acrylate having high hardness is particularly preferred.

Adhesive Layer

The adhesive layer 11 is preferably formed of a hot-melt adhesive composed of any of copolymers mentioned below.

Adhesives comprising, as a main component, at least one of copolymers mentioned below are excellent in imparting high shelf stability and durability to the optical recording medium, and particularly have an excellent effect on the shelf stability and durability of polymethine dyes.

The weight average molecular weight of the copolymer contained in the adhesive layer is preferably within a range of from about 10,000 to 1,000,000, more preferably from 30,000 to 800,000.

An ethylene-acrylic acid copolymer contained in the adhesive layer has a structure that carboxyl groups are contained at random in the molecular structure of polyethylene as represented by, for example, the structural formula

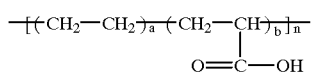
(II)

wherein a, b and n are independently a positive integer.

An ethylene-acrylic ester copolymer contained therein is a copolymer of ethylene and an acrylic ester as represented by, for example, the structural formula

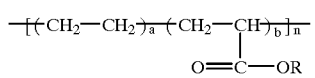
(III)

wherein a, b and n are independently a positive integer, and R is $CH_3$, $C_2H_5$ or $C_3H_7$.

An ethylene-methacrylic acid copolymer contained therein has a structure that carboxyl groups are contained at random in the molecular structure of polyethylene as represented by, for example, the structural formula

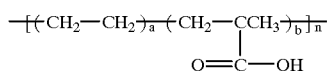
(IV)

wherein a, b and n are independently a positive integer.

An ethylene-methacrylic ester copolymer contained therein has such a structure as represented by, for example, the structural formula

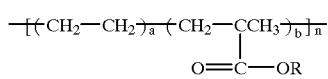
(V)

wherein a, b and n are independently a positive integer, and R is $CH_3$, $C_2H_5$ or $C_3H_7$.

Among the above-described copolymers, the ethylene-acrylic acid copolymer (EAA), ethylene-methyl acrylate copolymer (EMA), ethylene-methacrylic acid copolymer (EMAA) and ethylene-methyl methacrylate copolymer (EMMA) are particularly preferred.

The adhesive layer contains at least one of the above-described four kinds of copolymers or may contain a mixture of at least two kinds of copolymers.

In the present invention, a mixture of at least two different copolymers of the same kind, for example, the ethylene-methyl methacrylate copolymer and the ethylene-ethyl methacrylate copolymer, may be contained in the adhesive layer.

Incidentally, the content of acrylic acid, acrylic ester, methacrylic acid or methacrylic ester in the copolymer can be calculated out by determining the absorption of carbonyl by an infrared absorption spectrum.

Examples of additives added to the adhesive layer include tackifiers and softeners. Examples of the tackifiers include natural resins such as rosin, polymerized rosin, hydrogenated rosin and rosin esters, and modified products thereof, aliphatic compounds, alicyclic compounds, aromatic petroleum resins, terpene resins, terpene-phenol resins, hydrogenated terpene resins, and cumarone resins. Examples of the softeners include process oil, paraffin oil, castor oil, polybutene and low-molecular weight polyisoprene. In the present invention, as needed, an ultraviolet absorbent and/or the like may be further added to the adhesive layer within limits not causing an interaction with the optical recording layer and changing the above-described properties.

Any of the above-described adhesives is preferred as the adhesive. However, no particular limitation is imposed on the adhesive so far as it does not affect the optical recording layer at 80° C. or lower and has high adhesive strength. In order to more increase the effects of the present invention, it is preferable to use an adhesive at least melted at 100 to 150° C., because when it is intended to reproduce the forgery-preventing layer, a hot pressing step of heating at 130 to 150° C. is required, so that traces such as melting of the adhesive by the hot pressing to overflow the outer periphery of the optical card, lowering in the reflectance of the optical recording layer or generation of bubbles in the adhesive layer due to the melting are left, thereby making the forgery of the optical card clear.

Optical Recording Layer

When the wavelength of light used in recording, for example, the wavelength of an optical radiation beam like semiconductor laser is at least 650 nm, particularly within a range of from 700 to 900 nm, the optical recording layer 10 preferably has an absorption maximum within the wavelength region of this optical radiation beam. In addition, it is preferable that energy required to cause a change optically detectable by exposure of the optical recording layer to the optical radiation beam be small.

Further, it is preferable that a difference in optical properties between an information-recorded area and an unrecorded area be great.

Examples of the material used for the optical recording layer 10 include organic dye such as anthraquinone derivatives (particularly, those having an indanthrene skeleton), dioxazine compounds and derivatives thereof, triphenothiazine compounds, phenanthrene derivatives, cyanine compounds, merocyanine compounds, pyrylium type compounds, xanthene type compounds, triphenylmethane type compounds, croconium dyes, azo dyes, crocones, azines, indigoids, polymethine dyes, azulene dyes, squalium dyes, cyanine dyes having a polymethine chain, and tetraphenylcyanine dyes.

In particular, when a polymethine dye represented by the following general formula (1) is used in the optical recording layer, an information recording medium excellent in, particularly, durability can be obtained.

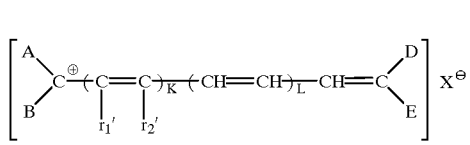
(1)

wherein A, B, D and E are independently selected from the group consisting of hydrogen atom, alkyl, alkenyl, aralkyl, aryl, styryl and heterocyclic; $r_1'$ and $r_2'$ are independently selected from the group consisting of hydrogen atom, alkyl, cycloalkyl, alkenyl, aralkyl and aryl; k is 0 or 1; L is 0, 1 or 2; and X⁻ is an anion; with the proviso that the aralkyl, aryl, styryl and heterocyclic in A, B, D, E, $r_1'$ and $r_2'$ may be substituted.

The individual reference characters in the general formula (1) will hereinafter be described in more detail.

A, B, D and E may be independently selected from the group consisting of hydrogen atom and alkyl (for example, methyl, ethyl, n-propyl, isopropyl, n-butyl, sec-butyl, isobutyl, t-butyl, n-amyl, t-amyl, n-hexyl, n-octyl and t-octyl); and besides the other alkyl, for example, substituted alkyl (for example, 2-hydroxyethyl, 3-hydroxypropyl, 4-hydroxybutyl, 2-acetoxyethyl, carboxymethyl, 2-carboxyethyl, 3-carboxypropyl, 2-sulfoethyl, 3-sulfopropyl, 4-sulfobutyl, 3-sulfatopropyl, 4-sulfatobutyl, N(methylsulfonyl)carbamylmethyl, 3-(acetylsulfamyl) propyl and 4-(acetylsulfamyl)butyl), and cycloalkyl (for example, cyclohexyl); alkenyl (for example, vinyl, propenyl, butenyl, pentenyl, hexenyl, heptenyl, octenyl, dodecenyl and prenyl); aralkyl (for example, benzyl, phenethyl, α-naphthylmethyl and β-naphthylmethyl); substituted aralkyl (for example, carboxybenzyl, sulfobenzyl and hydroxybenzyl); aryl (for example, phenyl); and substituted aryl (for example, diethylaminophenyl).

$r_1'$ and $r_2'$ may be independently selected from the group consisting of hydrogen atom and alkyl (for example, methyl, ethyl, n-propyl, isopropyl, n-butyl, sec-butyl, isobutyl, t-butyl, n-amyl, t-amyl, n-hexyl, n-octyl and t-octyl); and besides the other alkyl, for example, substituted alkyl (for example, 2-hydroxyethyl, 3-hydroxypropyl, 4-hydroxybutyl, 2-acetoxyethyl, carboxymethyl, 2-carboxyethyl, 3-carboxypropyl, 2-sulfoethyl, 3-sulfopropyl, 4-sulfobutyl, 3-sulfatopropyl, 4-sulfatobutyl, N-(methylsulfonyl)carbamylmethyl, 3-(acetylsulfamyl) propyl and 4-(acetylsulfamyl)butyl), and cycloalkyl (for example, cyclohexyl); alkenyl (for example, vinyl, propenyl, butenyl, pentenyl, hexenyl, heptenyl, octenyl, dodecenyl and prenyl); aralkyl (for example, benzyl, phenethyl, α-naphthylmethyl and β-naphthylmethyl); and substituted aralkyl (for example, carboxybenzyl, sulfobenzyl and hydroxybenzyl).

The optical recording layer containing any of these organic dyes may contain a stabilizer such as an infrared absorbent with a view to improving the light fastness thereof.

Examples of a material used as the stabilizer include substances disclosed in Japanese Patent Application Laid-Open Nos. 60-163245 and 60-236131, and substances represented by the formulae

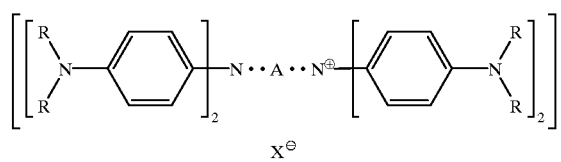

X⁻

(VI)

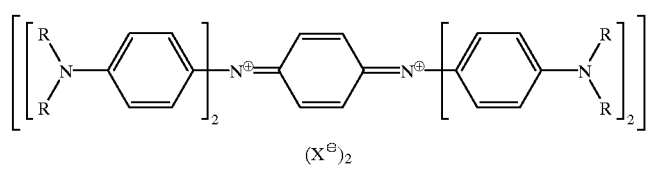

(X⁻)₂

(VII)

wherein R is hydrogen atom or lower alkyl, X is an acid ion, and A is

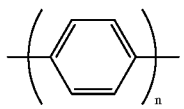

in which n is an integer of 1 or 2.

A compound, in which the substituent R in the formulae (VI) and (VII) is replaced by alkoxyalkyl (for example, methoxyethyl), alkenyl (for example, propenyl), alkynyl (for example, propargyl) or cycloalkyl (for example, cyclopentyl), is excellent in the function of stabilizing the organic dyes and moreover in the solubility in solvents, and is hence a particularly suitable material when the optical recording layer is formed by a wet coating method.

In the present invention, the material for forming the optical recording layer is preferably decomposed or melted under conditions of the order of 140° C. and 60 seconds to lower the reflectance of the optical recording layer formed. In addition, the substance represented by the formula (VI) or (VII) is preferably added to the material.

As a quencher having an effect of stabilizing the organic dyes, there may be used any of metal complexes represented by the formulae (VIII) to (XII):

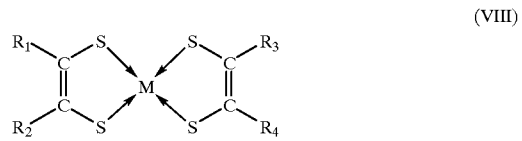

(VIII)

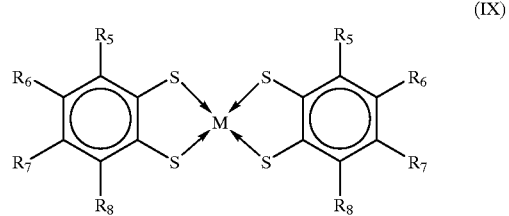

(IX)

-continued

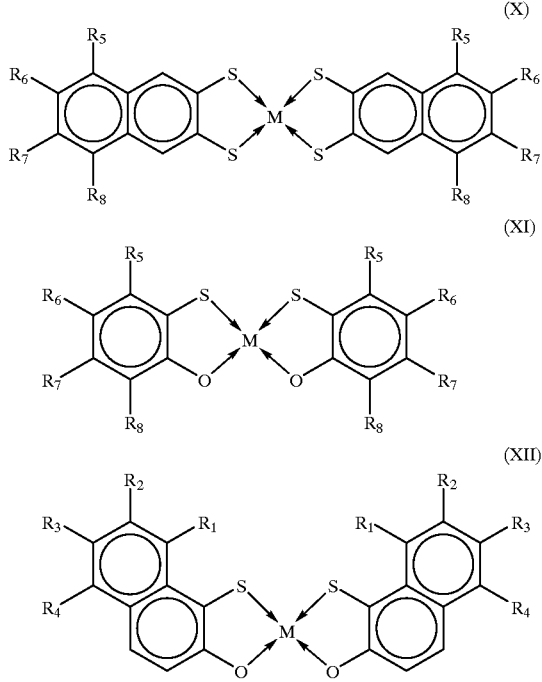

wherein $R_1$ to $R_4$ may be the same or different from one another and are independently selected from the group consisting of substituted or unsubstituted alkyl, aryl and amino, $R_5$ to $R_8$ may be the same or different from one another and are independently selected from the group consisting of hydrogen atom, halogen atom, substituted or unsubstituted alkyl and amino, and M is transition metal selected from the group consisting of Ni, Co, Mn, Cu, Pd and Pt.

The amount of the stabilizer and quencher contained in the optical recording layer 10 is desirably within a range of generally from 5 to 50% by weight, preferably from 10 to 30% by weight based on the content of the dye.

In the optical recording layer in the present invention, the above-described organic dyes, stabilizers and quenchers may be contained in a binder in a dispersed or dissolved state.

Examples of the binder used in the present invention include cellulose esters such as nitrocellulose, cellulose phosphate, cellulose sulfate, cellulose acetate, cellulose propionate, cellulose butyrate, cellulose myristate, cellulose palmitate, cellulose acetate propionate and cellulose acetate butyrate, cellulose ethers such as methyl cellulose, ethyl cellulose, propyl cellulose and butyl cellulose, polystyrene, and polyvinyl chloride.

When the optical recording layer is formed with the organic dye by a wet coating method, an organic solvent usable in the coating varies according to whether the organic dye is dispersed or dissolved. However, there may be generally used alcohols such as methanol, ethanol, isopropanol and diacetone alcohol, ketones such as acetone, methyl ethyl ketone and cyclohexanone, amides such as N,N-dimethylformamide and N,N-dimethylacetamide, sulfoxides such as dimethyl sulfoxide, ethers such as tetrahydrofuran, dioxane and ethylene glycol monomethyl ether, and aliphatic halogenated hydrocarbons such as dichloromethane, dichloroethylene and trichloroethylene.

As a method for coating the transparent substrate with the coating formulation, may be used any of the known coating methods, for example, dip coating, spray coating, spin coating, bar coating, blade coating, roll coating and curtain coating methods.

The film thickness of the optical recording layer is preferably within a range of from 400 to 1,200 Å. In general, the film thickness is preferably preset in such a manner that a surface reflectance become maximum according to the correlation between the film thickness and the reflectance of the optical recording layer in that an excellent C/N signal is obtained. Further, the film thickness is preferably preset in such a manner that the surface reflectance of the recording layer become minimum when a reflection layer is provided on the side opposite to the side of the recording layer on which an optical radiation beam is incident, in that sensitivity to recording is enhanced.

Production Process of Optical Card

The production process of the optical card illustrated in FIGS. 1 to 3 will hereinafter be described. The transparent substrate 8 provided with the guide grooves 9 on one side is first provided, and hard coat layer 7 is formed on the other side opposite to the side in which the guide grooves 9 have been formed. The optical recording layer 10 is then formed on the side in which the guide grooves 9 have been formed. On the other hand, the design print 6 as visible information is provided on one side of the protective substrate 12, and the masking layer 13 is formed on the other side thereof. For example, another design print 6 is then provided on the masking layer 13.

Here, the masking layer 13 is provided for masking the design prints 6 provided on both sides of the protective substrate 12 from being both visually observed from the side of the transparent substrate 8.

The masking layer 13 preferably has a low transmittance to, for example, visible light, i.e., a transmittance of 10% or lower to, for example, light having a wavelength of 400 to 900 nm. The thickness thereof is also preferably controlled to 3 to 30 $\mu$m so as not to affect the thickness of the resulting optical recording medium (particularly, optical card). This kind of the masking layer 13 is obtained by using, for example, a printed layer. When the masking layer 13 is formed by printing, a printed layer containing aluminum powder or aluminum oxide powder is preferably used. In this case, the content of the powder in the printed layer is preferably 30 to 70% by weight, particularly 30 to 60% by weight in order to achieve the above transmittance and prevent the printed layer from peeling off the protective substrate and cracking. Such a printed layer having a thickness of 3 to 30 $\mu$m can be formed, for example, in accordance with any general printing technique using a liquid resin for a printing ink obtained by adding 10 to 30% by weight of aluminum powder or aluminum oxide powder to a liquid resin for printing ink. More specifically, a liquid obtained by adding 10 to 30% by weight of aluminum powder having an average particle size of about 0.1 to 3 $\mu$m or aluminum oxide powder having about the same particle size to a liquid resin (Sericol EGS, trade name, product of Teikoku Ink, Mfg. Co., Ltd.) containing about 10 to 20% by weight of a polyester resin is applied to a thickness of about 3 to 30 $\mu$m by a general printing method (for example, screen printing), thereby obtaining a printed layer which has excellent impermeability to visible light, hardly has peeling and cracking when the resulting optical card is bent, and is suitable for use as the masking layer. Incidentally, the materials for such a masking layer may exhibit a reflectance exceeding 30% to, for example, light within an infrared region in some cases. Therefore, when such light causes a noise against optical reproducing signals regarding the optical recording layer, the masking layer 13 may be formed of plural layers, for example, a laminated film of printed layers. For example, a laminated film layer 5 μm in thickness formed of an ink obtained by mixing the above-described particles of aluminum or aluminum oxide and the printed layer 4 μm in thickness formed of a white ink containing titanium oxide can reduce the transmittance to visible rays to 10% or lower and so may be suitably used as shielding layer 13.

The print-receiving layer 2 is then provided on the side of the protective substrate 12, on which design print 6 has been provided through the masking layer 13. The formation of the print-receiving layer 2 on the surface of protective substrate 12 may be suitably conducted according to materials used for the respective layers. For example, when a polycarbonate resin is used for the protective substrate 12, and a vinyl chloride resin is used for the print-receiving layer 2, both layers may be press-bonded to each other at a temperature of about 130 to 140° C. The print-receiving layer 2 may also be bonded to the protective substrate through an adhesive layer. Alternatively, the material of the print-receiving layer may be dissolved or dispersed in a solvent or the like, and the solution or dispersion may be coated on the surface of the protective substrate 12, thereby forming the print-receiving layer 2 on the surface of the protective substrate 12.

The forgery-preventing layer 4 is then formed at the predetermined position of the print-receiving layer 2 and embedded in the print-receiving layer so as to make substantially no difference in level between the surface of the forgery-preventing layer 4 and the surface of the print-receiving layer 2. Here, the embedding of the forgery-preventing layer in the print-receiving layer may be conducted at the same time as or prior to the bonding of the print-receiving layer to the protective substrate. More specifically, after the forgery-preventing layer is arranged at the predetermined position of the outer surface of the print-receiving layer, the print-receiving layer is then placed on the side of the protective substrate, on which the design print 6 has been provided through the masking layer 13, and heat and pressure are then applied to the forgery-preventing layer and the print-receiving layer, whereby the embedding of the forgery-preventing layer in the print-receiving layer and the bonding of the print-receiving layer to the protective substrate can be conducted at the same time. Alternatively, after the forgery-preventing layer is arranged at the predetermined position of the outer surface of the print-receiving layer and then embedded therein by hot pressing, the thus-treated print-receiving layer may be bonded to the protective substrate either with an adhesive or by thermocompression bonding.

The transparent substrate, on which the optical recording layer has been formed, and the protective substrate having the print-receiving layer in which the forgery-preventing layer has been embedded are arranged in such a manner that the optical recording layer faces a side of the protective substrate opposite to the side above which the forgery-preventing layer has been formed, and are bonded to each other through the adhesive layer 11, thereby obtaining an optical card. Visible information is applied to the surface of the forgery-preventing layer 4 or both surfaces of the print-receiving layer 2 and the forgery-preventing layer 4 of the thus-obtained optical card by, for example, thermal transfer printing, whereby such an optical card having the visible information as illustrated in FIGS. 1 to 3 can be obtained.

Figure 4:
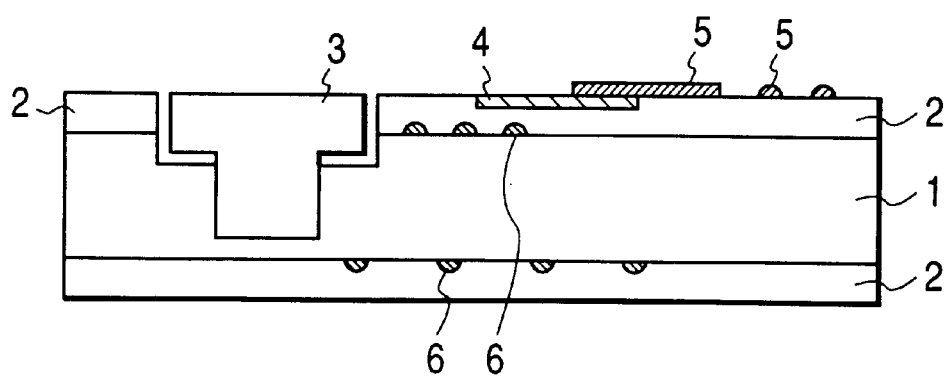
FIG. 4 is a schematic cross-sectional view of an information recording medium according to another embodiment of the present invention.

A schematic cross-sectional view of an information recording medium according to another embodiment of the present invention is illustrated in FIG. 4. In FIG. 4, design prints 6 are provided on both sides of a core material 1 in the form of a sheet, and transparent print-receiving layers 2 are formed so as to cover the design prints 6. A forgery-preventing layer 4 is provided in one of the print-receiving layers 2. Reference numeral 3 designates an IC chip which is embedded and fixed in the core material 1. Visible information, for example, ID personal information is applied so as to extend over both surfaces of the print-receiving layer 2 and the forgery-preventing layer 4.

As with the information recording medium according to the first embodiment, the information recording medium according to this embodiment is so constructed that no difference in level substantially arises between the surface of the forgery-preventing layer 4 and the surface of the print-receiving layer 2. The print-receiving layer and the forgery-preventing layer and besides the visible information (ID personal information or the like) applied to these surfaces may be exactly the same as those in the first embodiment.

The thickness of the core material is preferably 500 to 700μm, and PVC, PET or ABS is used as a material thereof.

According to the respective embodiments of the present invention, as described above, traces of some alteration having been made to the visible information applied to the information recording media can be left on the information recording media if the visible information is forged. As a result, it is possible to prevent an information recording medium, for example, an ID card, for a person from being forged by, for example, scraping off the visible ID information of the person and printing the visible ID information of another person by a thermal transfer printer.

In the case of an ID card using an optical card, the constitution of the present invention is particularly useful for preventing the forgery of the card. Namely, when it is intended to reproduce the forgery-preventing layer, the optical record-reproducing function of the optical card can be destroyed, whereby the forgery of the card can be prevented.

The present invention will hereinafter be described more specifically by the following examples.

EXAMPLE 1

An IC card of the same construction as illustrated in FIG. 4 was produced.

Design prints were provided on both sides of a white vinyl chloride resin sheet (thickness: 550 μm, product of Tsutsunaka Plastic Industry Co., Ltd.). Rigid vinyl chloride resin sheets (products of Hoechst Co.) having a thickness of 100 μm were then laminated on the printed layers, and the following material was further applied to a predetermined position of one of the rigid vinyl chloride resin sheets by printing and cured, thereby providing a forgery-preventing layer.

Forgery-preventing Layer:

(A) Ink:

| | |
|---|---|
| Ultraviolet curing resin UVFIL 50112 (trade name, product of Teikoku Ink, Mfg. Co., Ltd.) | 90 parts by weight |
| Pearlescent pigment | 10 parts by weight. |

(B) Conditions of printing and curing:
Printing: pad printing
Curing conditions:

| metal halide lamp 80 W/cm | 2 lamps |
|---|---|
| lamp height | 15 cm |
| feed rate | 10 m/min. |

The forgery-preventing layer was embedded in the rigid vinyl chloride resin sheet having a thickness of 100 μm by hot pressing under conditions: temperature of 150° C., time of 30 seconds and pressure of 2 kg/cm², and at the same time the rigid vinyl chloride resin sheets were bonded to the white vinyl chloride resin sheet. The thus-obtained laminate was cut into a size of an ID card, a hole for embedding an IC chip therein is bored in the card by milling, and an IC chip having a capacity of 8 kB was embedded in the hole, thereby obtaining the IC card.

EXAMPLE 2

Figure 2:
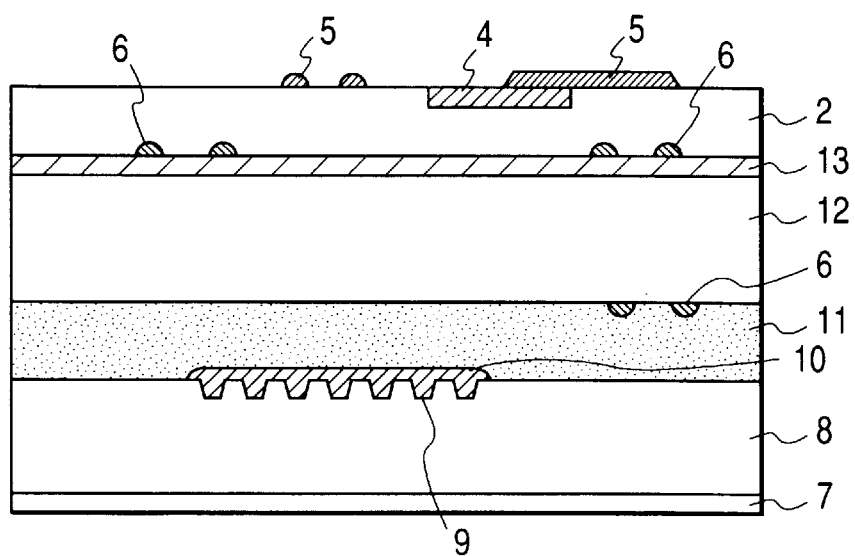
FIG. 2 is a cross-sectional view taken on line 2—2 of FIG. 1.
Figure 3:
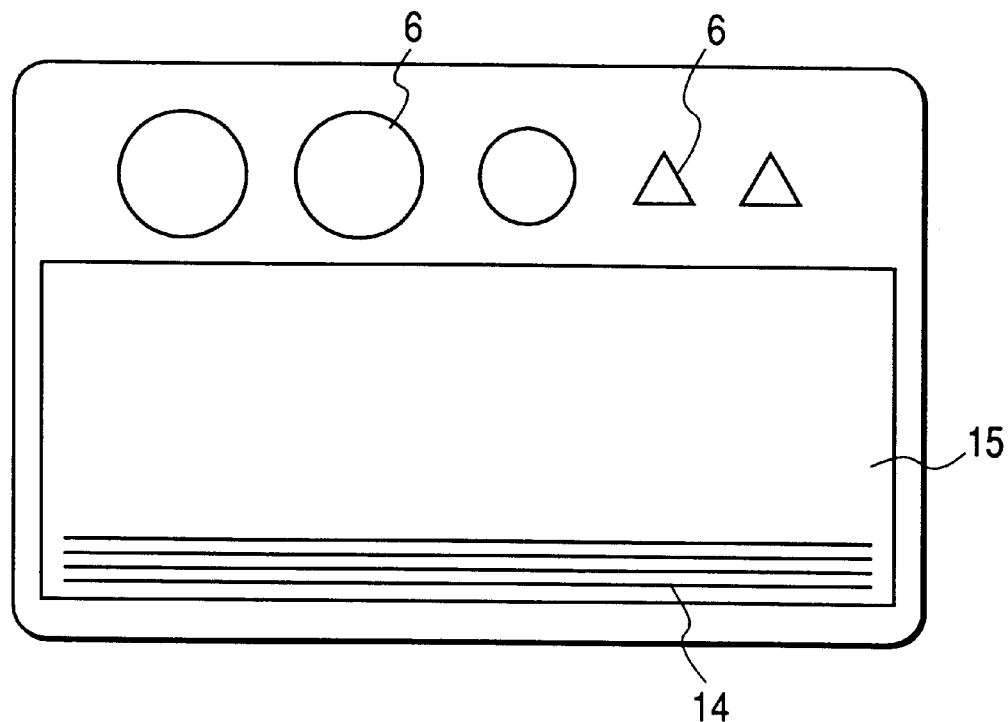
FIG. 3 is a schematic plan view of the other surface of the, information recording medium shown in FIG. 1.

An optical card of the same construction as illustrated in FIGS. 1 to 3 was produced.

A polycarbonate substrate (thickness: 400 μm) having guiding grooves in one surface thereof was provided, and a hard coating layer composed of an ultraviolet curing urethane-acrylate resin (UNIDIC 17-824-9, trade name, product of Dainippon Ink & Chemicals, Incorporated) was formed to a thickness of 5 μm on a guiding groove-free surface of the polycarbonate substrate.

An optical recording layer containing dyes having respective structures represented by the following formulae (A) and (B) was then formed on the surface in which the guiding grooves had been formed.

the vinyl chloride resin sheet by printing and photo-cured, thereby providing a forgery-preventing layer. The thickness of the forgery-preventing layer was 5,000 Å.

Forgery-preventing layer:
(A) Ink:

| Ultraviolet curing resin UVSPS 50112 (trade name, product of Teikoku Ink, Mfg. Co., Ltd.) | 90 parts by weight |
|---|---|
| Nickel metal foil (obtained by cutting a nickel metal film having a thickness of 2,000 Å into pieces 10 μm square) | 10 parts by weight. |

(B) Conditions of printing and curing:
Printing: pad printing
Curing conditions:

| metal halide lamp 80 W/cm | 2 lamps |
|---|---|
| lamp height | 15 cm |
| feed rate | 10 m/min. |

The forgery-preventing layer was embedded in the vinyl chloride resin sheet by hot pressing under conditions: temperature of 150° C., time of 30 seconds and pressure of 2 kg/cm².

The substrate, on which the optical recording layer had been formed, and the protective substrate, on which the printed layers had been formed, were bonded to each other through a hot-melt adhesive 50 μm in thickness (Crown Better P-2200, trade name, product of Kurabo Industries, Ltd.), thereby obtaining the optical card. The bonding was conducted at a temperature of 120° C.

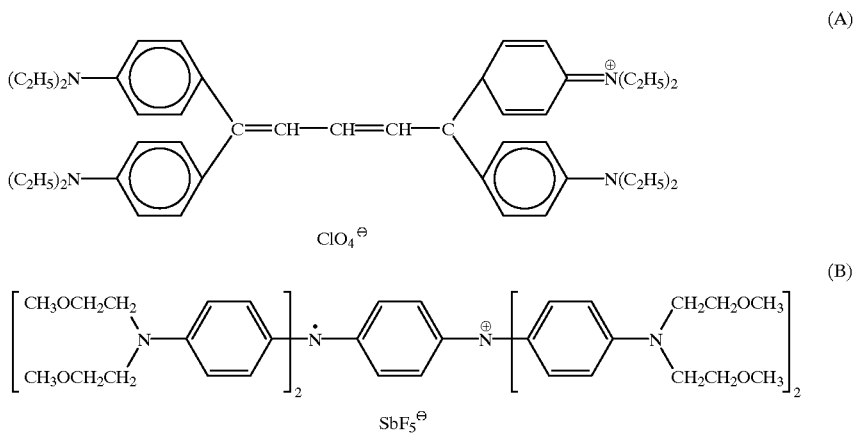

The recording layer contained 75% by weight of the dye represented by the formula (A) and 25% by weight of the dye represented by the formula (B).

A protective substrate (thickness: 280 μm) formed of transparent polycarbonate, on which design prints had been provided, was then provided. The thickness of the printed layer was 30 μm including logo print and light-shielding layer. A vinyl chloride resin sheet having a thickness of 40 μm was temporarily stuck on the surface of the printed layer by means of a roll laminator of 60° C. The following material was further applied to a predetermined position of ID personal information and a name were then printed on the print-receiving layer and the forgery-preventing layer of the thus-obtained optical card by means of a thermal transfer printer. The metallic luster of the nickel metal foil was partially observed on the outer surface of the forgery-preventing layer, and so it was visually distinguishable from its surrounding print-receiving layer.

The printed name on the forgery-preventing layer was scraped off with abrasives and cloth. As a result, the forgery-preventing layer was also scraped off together with the name.

The ID personal information and name were able to be printed again on the surface of the vinyl chloride resin sheet by means of a thermal transfer printer. However, a difference in level arose in the surface of the optical card because the forgery-preventing layer had been scraped off, so that it was easily confirmed that the optical card was forged.

EXAMPLE 3

An optical card was produced in the same manner as in Example 2 except that the adhesive used for the optical card of Example 2 was changed to Crown Better 0-4121 (trade name, hot-melt adhesive, product of Kurabo Industries, Ltd.).

A name and a portrait were printed on the surface of the vinyl chloride resin film of the optical card by means of a thermal transfer printer. A part of the portrait was printed on the surface of the forgery-preventing layer.

The portrait was then scraped off with abrasives to attempt the forgery of the ID personal information. The portrait was able to be scraped off. However, the forgery-preventing layer was also scraped off. In order to reproduce the forgery-preventing layer, the liquid resin composition containing the nickel metal foil was then applied to the surface of the vinyl chloride resin film, to conduct the following tests.

(i) Case where the liquid resin composition was only applied and photo-cured, and the forgery-preventing layer was not embedded in the surface of the vinyl chloride resin film:

When a portrait was printed again by a thermal transfer printer, it was impossible to print the portrait on the periphery of a difference in level made at the interface between the forgery-preventing layer and the vinyl chloride resin film. The surface of the forgery-preventing layer also became uneven, and so the portrait could not be printed beautifully.

(ii) Case where the forgery-preventing layer reproduced in the case (i) was embedded by hot pressing:

When the forgery-preventing layer was embedded in the surface of the vinyl chloride resin film under conditions: temperature of 145° C., pressure of 2 kg/cm$^2$ and time of 45 seconds, the forgery-preventing layer was able to be reproduced. However, the adhesive layer was decomposed to bubble, so that the recorded information was destroyed. Additional recording was also infeasible. EXAMPLE 4

A portrait and a name were printed on the surface of the vinyl chloride resin film of the optical card produced in Example 2 by a thermal transfer printer in such a manner that a part of the portrait extends to the surface of the forgery-preventing layer.

An experiment in forgery was conducted for the optical card in the same manner as in Example 3. When hot pressing was conducted in the same manner as in Example 3 to reproduce the forgery-preventing layer, the reflectance of the optical recording layer was reduced, so that additional recording was infeasible. It was also impossible to read the already recorded information.

Accordingly, it was confirmed that the visible ID information of the optical cards according to the present invention can be prevented from being forged or altered.

Comparative Example 1

An IC card was produced in the same manner as in Example 1 except that only the forgery-preventing layer of the IC card according to Example 1 was not provided.

It was attempted to forge the IC card in the same manner as in Example 3. As a result, the ID information was easily scraped with the abrasives. The portrait was able to be printed again on the surface of the vinyl chloride resin film as the print-receiving layer by a thermal transfer printer. Since no forgery-preventing layer was provided on the IC card, any trace of some alteration having been made to the visible information was not left on the IC card.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information recording medium comprising a card substrate and a print-receiving layer provided on the surface thereof, wherein the print-receiving layer is provided with a forgery-preventing layer at a part of an outer surface of said print-receiving layer, wherein the forgery-preventing layer (i) has a printable outer surface and (ii) is embedded in the print-receiving layer.

2. The information recording medium according to claim 1, wherein personal information is printed on the outer surface of the forgery-preventing layer by a sublimate type thermal transfer layer.

3. The information recording medium according to claim 1, wherein the information recording medium comprises an optical recording layer.

4. The information recording medium according to claim 3, wherein the thermal resistance temperature of the optical recording layer is 100 to 140° C.

5. An information recording medium comprising a transparent substrate, an optical recording layer, a protective layer and a print-receiving layer in that order, wherein the print-receiving layer is provided with a forgery-preventing layer which is arranged in such a manner that an outer surface of the forgery-preventing layer and an outer surface of the print-receiving layer are substantially on a same plane, and the forgery-preventing layer has a surface visually distinguishable from the print-receiving layer and a thickness of 0.1 to 1 $\mu$m.

6. The information recording medium according to claim 5, wherein the outer surface of the forgery-preventing layer has an reflectance different from that of the print-receiving layer.

7. The information recording medium according to claim 5, wherein the thickness of the forgery-preventing layer is 0.2 to 1 $\mu$m.

8. The information recording medium according to claim 5, where in a layer representing visible information is arranged so as to extend over both the outer surface of the print-receiving layer and the outer surface of the forgery-preventing layer.

9. An information recording medium comprising a substrate provided with an IC chip, wherein the substrate is provided, on at least one side thereof, with a print-receiving layer which is provided with a forgery-preventing layer having an outer surface visually distinguishable from the print-receiving layer and a thickness of 0.1 to 1 $\mu$m, and the forgery-preventing layer is arranged in such a manner that an outer surface of the forgery-preventing layer and an outer surface of the print-receiving layer are substantially on a same plane.

10. The information recording medium according to claim 9, wherein the thickness of the forgery-preventing layer is 0.2 to 1.0 μm.

11. The information recording medium according to claim 9, wherein a layer representing visible information is arranged so as to extend over both the outer surface of the print-receiving layer and the outer surface of the forgery-preventing layer.

12. The information recording medium according to claim 1, wherein a visible information layer is arranged so as to extend over both the outer surface of the print-receiving layer and the outer surface of the forgery-preventing layer.

13. The information recording medium according to claim 12, wherein the forgery-preventing layer is comprised of a cured product of an ultraviolet curing resin containing a pigment.

14. The information recording medium according to claim 13, wherein the pigment is a pearlescent pigment.

15. The information recording medium according to claim 13, wherein the pigment is comprised of pieces of metal foil.

16. The information recording medium according to claim 13, wherein the pigment is an ultraviolet-luminescent substance.

17. An information recording medium comprising a card substrate and a print-receiving layer provided on the surface thereof, wherein the print-receiving layer is provided with a forgery-preventing layer at a part of an outer surface of said print-receiving layer, wherein the forgery-preventing layer (i) has a printable outer surface and (ii) is embedded in the print receiving layer, and wherein the thickness of the forgery-preventing layer is 0.1 to 1 μm.

18. The information recording medium according to claim 17, wherein the forgery preventing layer is arranged in such a manner that the outer surface of the forgery-preventing layer and the outer surface of the print-receiving layer are substantially on a same plane.

19. The information recording medium according to claim 18, wherein the outer surface of the forgery-preventing layer is visually distinguishable from the outer surface of the, print-receiving layer.

20. The information recording medium according to claim 19, wherein the outer surface of the forgery-preventing layer has a reflectance different from that of the print-receiving layer.

21. The information recording medium according to claim 19, wherein the forgery-preventing layer is comprised of a cured product of an ultraviolet curing resin containing a, pigment.

22. The information recording medium according to claim 21, wherein the pigment is a pearlescent pigment.

23. The information recording medium according to claim 21, wherein the pigment is comprised of pieces of metal foil.

24. The information recoding medium according to claim 21, wherein the pigment is an ultra-violet luminescent substance.

25. The information recording medium according to claim 19, wherein personal information is printed on the outer surface of the forgery-preventing layer by sublimate type thermal transfer printer.

26. The information recording medium according to claim 17, further comprising an optical recording layer.

27. The information recording medium according to claim 26, wherein the thermal resistance temperature of the optical recording layer is 100 to 140° C.

28. The information recording medium according to claim 17, wherein the thickness of the print-receiving layer is 30–100 μm.

29. The information recording medium according to claim 17, wherein a visible information layer is arranged so as to extend on both the outer surface of the print-receiving layer and the outer surface of the forgery-printing layer.

30. An information recording medium comprising a card substrate and a print-receiving layer provided on the surface thereof, wherein the print-receiving layer is provided with a forgery-preventing layer at a part of an outer surface of said print-receiving layer, wherein the forgery-preventing layer (1) has a printable outer surface and (ii) is embedded in the print-receiving layer, and wherein the forgery-preventing layer is comprised of a cured product of an ultraviolet curing resin containing a pigment.

31. The information recording medium according to claim 30, wherein the pigment is a pearlescent pigment.

32. The information recording medium according to claim 30, wherein the pigment is comprised of pieces of metal foil.

33. The information recording medium according to claim 30, wherein the pigment is an ultraviolet-luminescent substance.

34. An information recording medium comprising a substrate, optical recording layer, a protective layer and a print-receiving layer, the optical recording layer and the protective layer being between the substrate and the print receiving layer, wherein the print-receiving layer is provided with a forgery-preventing layer at a part of an outer surface of said print-receiving layer, wherein the forgery-preventing layer (i) has a printable outer surface and (ii) is embedded in the print-receiving layer, and the forgery-preventing layer is arranged in such a manner that the outer surface of the forgery-preventing layer and the outer surface of the print-receiving layer are substantially on a same plane, and wherein the outer surface of the forgery-preventing layer is visually distinguishable from the outer surface of the print-receiving layer and a thickness of the forgery-preventing layer is 0.1–1 μm.

35. The information recording medium according to claim 34, wherein the outer surface of the forgery-preventing layer has a reflectance different from that of the print-receiving layer.

36. The information recording medium according to claim 34, wherein the thickness of the forgery-preventing layer is 0.2–1 μm.

37. The information recording medium according to claim 34, wherein a visible information layer is arranged so as to extend on both the outer surface of the print-receiving layer and the outer surface of the forgery-preventing layer.

38. The information recording medium according to claim 34, wherein the thermal resistance temperature of the optical recording layer is 100 to 140° C.

39. The information recording medium according to claim 34, wherein the optical recording layer comprises an organic dye.

40. A process for producing an information recording medium comprising a transparent substrate, an optical recording layer, a protective layer and a print-receiving layer in that order, wherein the print-receiving layer is provided with a forgery-preventing layer which is arranged in such a manner that an outer surface of the forgery-preventing layer and an outer surface of the print-receiving layer are substantially on a same plane, and the forgery-preventing layer has a surface visually distinguishable from the print-receiving layer and a thickness of 0.1 to 1 μm, which comprises the steps of:

(i) forming the optical recording layer on the surface of the transparent substrate;

(ii) forming the print-receiving layer on the surface of the protective layer;

(iii) forming the forgery-preventing layer on the outer surface of the print-receiving layer;

(iv) embedding the forgery-preventing layer in the print-receiving layer; and (v) bonding the transparent substrate having the optical recording layer to the protective layer having the print-receiving layer in which the forgery-preventing layer has been embedded, in such a manner that the optical recording layer faces a side of the protective layer, opposite to the other side on which print-receiving layer has been formed, thereby obtaining the information recording medium.

41. The process according to claim 40, wherein the embedding of the forgery-preventing layer in the print-receiving layer is conducted by hot pressing.

42. The process according to claim 41, wherein the hot pressing is performed under such conditions that the optical recording layer is destroyed when the embedding of the forgery-preventing layer into the print-receiving layer is conducted after the production of the information recording medium.

43. A process for applying visible information to an information recording medium comprising an optical recording layer, which comprises the steps of:

i) providing an information recording medium comprising a transparent substrate, an optical recording layer, a protective layer and a print-receiving layer in that order, wherein the print-receiving layer is provided with a forgery-preventing layer having an outer surface visually distinguishable from the print-receiving layer and a thickness of 0.1 to 1 $\mu$m, and the forgery-preventing layer is arranged in such a manner that an outer surface of the forgery-preventing layer and an outer surface of the print-receiving layer are substantially on a same plane; and ii) applying the visible information so as to extend over both the outer surface of the print-receiving layer and the outer surface of the forgery-preventing layer.

* * * * *

UNITED STATES PATENT AND TRADEMARK OFFICE
CERTIFICATE OF CORRECTION

PATENT NO. : 6,146,741
DATED : November 14, 2000
INVENTOR(S) : Yoshihiro Ogawa et al.

Page 1 of 1

It is certified that error appears in the above-identified patent and that said Letters Patent is hereby corrected as shown below:

Column 2,
Lines 54 and 66, "plain," should read -- plane, --.

Column 3,
Line 34, "plain;" should read -- plane; --;
Line 48, "plain." should read -- plane. --; and
Line 57, "the," should read -- the --.

Column 9,
Line 17, "4-(acetylsulfamyl)butyl)," should read -- 4-(acetylsulfamyl)butyl, --.

Column 12,
Lines 7 and 12, "become" should read -- becomes --.

Column 17,
Line 45, "EXAMPLE 4" should read -- ¶ EXAMPLE 4: --.

Column 19,
Line 33, "forgery preventing" should read -- forgery-preventing --; and
Line 47, "a," should read -- a --.

Column 20,
Line 4, "forgery-printing" should read -- forgery-prevention --; and
Line 23, "print" should read -- print- --.

Column 21,
Line 10, "which" should read -- which the --.

Signed and Sealed this

Thirteenth Day of November, 2001

*Attest:*

NICHOLAS P. GODICI
*Attesting Officer*     Acting Director of the United States Patent and Trademark Office